US010204399B2

(12) United States Patent
Tang et al.

(10) Patent No.: US 10,204,399 B2
(45) Date of Patent: Feb. 12, 2019

(54) METHOD AND TERMINAL FOR IMPLEMENTING TURNING OF VIRTUAL CHARACTER

(71) Applicant: TENCENT TECHNOLOGY (SHENZHEN) COMPANY LIMITED, Shenzhen (CN)

(72) Inventors: Yong Tang, Shenzhen (CN); Changyan Liao, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 15/657,922

(22) Filed: Jul. 24, 2017

(65) Prior Publication Data
US 2017/0323428 A1 Nov. 9, 2017

Related U.S. Application Data

(63) Continuation of application No. PCT/CN2016/073060, filed on Feb. 1, 2016.

(30) Foreign Application Priority Data

Jun. 16, 2015 (CN) .......................... 2015 1 0334763

(51) Int. Cl.
G06T 3/60 (2006.01)
A63F 13/44 (2014.01)
A63F 13/55 (2014.01)

(52) U.S. Cl.
CPC ................ *G06T 3/60* (2013.01); *A63F 13/44* (2014.09); *A63F 13/55* (2014.09); *A63F 2300/6607* (2013.01)

(58) Field of Classification Search
CPC .. G06T 3/60; A63F 13/12; A63F 13/44; A63F 13/52; A63F 13/55; A63F 2300/66;
(Continued)

(56) References Cited

U.S. PATENT DOCUMENTS

2001/0019333 A1* 9/2001 Sasaki ...................... A63F 13/10
345/653
2010/0022302 A1* 1/2010 Iwakiri ................... A63F 13/12
463/30
(Continued)

FOREIGN PATENT DOCUMENTS

CN 1279798 A 1/2001
CN 101118248 A 2/2008
(Continued)

OTHER PUBLICATIONS

The World Intellectual Property Organization (WIPO) International Search Report for PCT/CN2016/073060 dated May 5, 2016.
(Continued)

*Primary Examiner* — Chante E Harrison
(74) *Attorney, Agent, or Firm* — Anova Law Group, PLLC

(57) ABSTRACT

The present disclosure relates to a method and a terminal for implementing turning of a virtual character. The method includes: obtaining a turning angle of a virtual character; obtaining a preset fixed turning time; calculating an average angular velocity of the virtual character according to the turning angle and the preset fixed turning time; and controlling the virtual character to turn at the average angular velocity. According to the method for implementing turning of a virtual character turning is performed at a constant speed in a turning process, smooth turning can be implemented, stalling is avoided in the turning process, and picture fluency can be improved. When the turning angle is relatively large, the average angular velocity is high, and
(Continued)

quick and smooth turning can be implemented; or when the turning angle is small, turning can also be implemented.

12 Claims, 6 Drawing Sheets

(58) Field of Classification Search
CPC .......... A63F 2300/6607; G06Q 10/01; H04M 1/72544
USPC ................ 345/643, 649, 653, 657, 655, 656
See application file for complete search history.

(56) References Cited

U.S. PATENT DOCUMENTS

| | | | |
|---|---|---|---|
| 2010/0091038 A1* | 4/2010 | Konno | ................. G06F 3/04815 345/653 |
| 2012/0190444 A1* | 7/2012 | Fujisawa | ................. A63F 13/10 463/31 |
| 2012/0229513 A1* | 9/2012 | Hayashi | ................. A63F 13/44 345/649 |

FOREIGN PATENT DOCUMENTS

| | | |
|---|---|---|
| CN | 101751688 A | 6/2010 |
| CN | 103760981 A | 4/2014 |
| CN | 103914067 A | 7/2014 |
| CN | 104915564 A | 9/2015 |
| GB | 2453658 A | 4/2009 |
| JP | 2009093437 A | 4/2009 |
| WO | 2014190106 A1 | 11/2014 |

OTHER PUBLICATIONS

The State Intellectual Property Office of the People's Republic of China (SIPO) Office Action 1 for 201510334763.4 dated Jun. 12, 2016.

The Japan Patent Office (JPO) Office Action for Application No. 2017-544610 dated Aug. 6, 2018 5 pages (including translation).

Studio Shin, Sprite Kit iPhone 2D game programming, Japan, Hidekazu System Co., Ltd., Feb. 5, 2014, First edition 1st press, p. 82-83 6 pages total.

* cited by examiner

METHOD AND TERMINAL FOR IMPLEMENTING TURNING OF VIRTUAL CHARACTER

CROSS-REFERENCES TO RELATED APPLICATION

This is a continuation application of PCT Patent Application No. PCT/CN2016/073060, filed on Feb. 1, 2016, which claims priority to Chinese Patent Application No. 201510334763.4, filed with the Chinese Patent Office on Jun. 16, 2015 and entitled "METHOD AND APPARATUS FOR IMPLEMENTING TURNING OF VIRTUAL CHARACTER", the entire contents of both of which are incorporated herein by reference.

FIELD OF THE TECHNOLOGY

The present disclosure relates to the field of data processing, and in particular, to a method and a terminal for implementing turning of a virtual character.

BACKGROUND OF THE DISCLOSURE

Rapid development of computer technologies has brought much convenience to people's life and has greatly improved people's life quality. When enjoying convenient life, people also need some entertainments. Therefore, various game products emerge. In a scenario of a conventional game product, when a player controls a virtual character to generate a turning angle by means of displacements, a fixed turning angle is generally used, and each time a turning movement is generated, the player always turns by the fixed turning angle. As shown in FIG. 1, a fixed turning angle a is set. Once a virtual character turns, if a turning angle is less than the fixed turning angle a, the virtual character does not turn; or if a turning angle is greater than the fixed turning angle a, the virtual character turns excessively quickly in an obviously reduced time, and consequently, picture non-fluency and stalling occur.

SUMMARY

Based on this, to resolve a conventional problem that picture non-fluency and stalling occur when a virtual character turns, it is necessary to provide a method for implementing turning of a virtual character, so that turning can be implemented, stalling can be avoided in a turning process, and picture fluency can be improved.

In addition, it is also necessary to provide an apparatus for implementing turning of a virtual character, so that turning can be implemented, stalling can be avoided in a turning process, and picture fluency can be improved.

One aspect of the present disclosure provides a method for implementing turning of a virtual character, including: obtaining a turning angle of a virtual character; obtaining a preset fixed turning time; calculating an average angular velocity of the virtual character according to the turning angle and the preset fixed turning time; and controlling the virtual character to turn at the average angular velocity.

Another aspect of the present disclosure provides a terminal, including a storage medium and a processor, the storage medium storing an instruction, and when the instruction is executed by the processor, the processor is configured to: obtain a turning angle of a virtual character; obtain a preset fixed turning time; calculate an average angular velocity of the virtual character according to the turning angle and the preset fixed turning time; and control the virtual character to turn at the average angular velocity.

Another aspect of the present disclosure provides non-transitory computer-readable medium containing computer-executable program for, when being executed by a processor, performing a method for implementing turning of a virtual character. The method includes: obtaining a turning angle of a virtual character; obtaining a preset fixed turning time; calculating an average angular velocity of the virtual character according to the turning angle and the preset fixed turning time; and controlling the virtual character to turn at the average angular velocity.

According to the method and the apparatus for implementing turning of a virtual character, a turning angle of a virtual character is obtained, a preset fixed turning time is obtained, an average angular velocity is calculated, and the virtual character is controlled to turn at the average angular velocity. Turning is performed at a constant speed in a turning process, smooth turning can be implemented, stalling is avoided in the turning process, and picture fluency can be improved. When the turning angle is relatively large, the average angular velocity is high, and quick and smooth turning can be implemented; or when the turning angle is small, turning can also be implemented. Therefore, turning is more precise.

BRIEF DESCRIPTION OF THE DRAWINGS

To describe the technical solutions in the embodiments of the present invention or in the existing technologies more clearly, the following briefly describes the accompanying drawings required for describing the embodiments or the existing technologies. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present disclosure clearer and more comprehensible, the following further describes the present disclosure in detail with reference to the accompanying drawings and embodiments. It should be understood that the specific embodiments described herein are merely used to explain the present disclosure but are not intended to limit the present disclosure.

It may be understood that terms "first", "second" and the like used in the present disclosure may be used to describe various elements in this specification, but the elements are not limited to the terms. The terms are merely used to distinguish a first element with another element. For example, in a case not departing from the scope of the present disclosure, a first client may be referred to as a second client, and similarly, a second client may be referred to as a first client. Both the first client and the second client are clients, but are not a same client.

Figure 1:
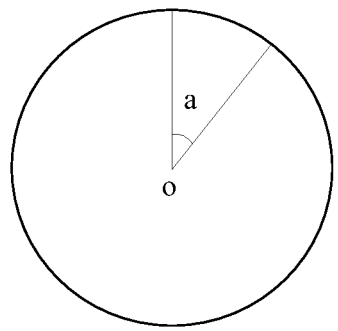
FIG. 1 is a schematic diagram of a fixed turning angle set in the conventional technology.
Figure 2A:
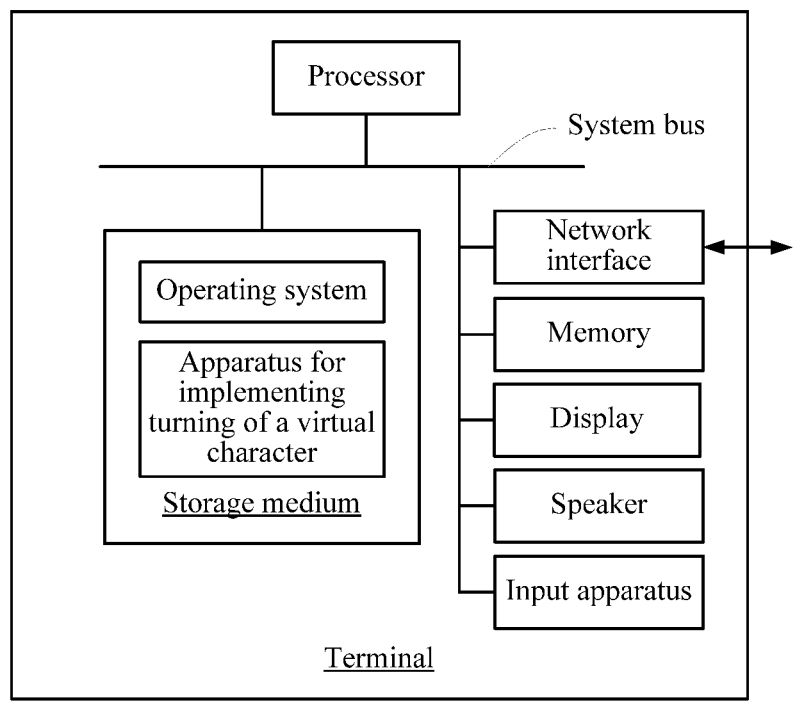
FIG. 2A is a schematic diagram of an internal structure of a terminal according to an embodiment.

FIG. 2A is a schematic diagram of an internal structure of a terminal according to an embodiment. As shown in FIG. 2A, the terminal includes a processor, a storage medium, a memory, and a network interface, a voice collection apparatus, a display, a speaker, and an input apparatus that are connected by using a system bus. The storage medium of the terminal stores an operating system, and further includes instructions for implementing turning of a virtual character. The processor is configured to provide computing and control capabilities, to support operation of the entire terminal (e.g., implementing turning of a virtual character based on the instructions stored in the storage medium). The memory of the terminal provides an environment for operation of the apparatus for implementing turning of a virtual character in the storage medium. The network interface is configured to perform network communication with a server, for example, upload data of a virtual character to the server, and receive related data of the virtual character that is returned by the server. The display of the terminal may be a liquid crystal display, an E-ink display, or the like. The input apparatus may be a touch layer covered on the display, or may be a button, a track ball, or a touchpad disposed on an external housing of the terminal, or may be an externally connected keyboard, touchpad, mouse, or the like. The terminal may be a mobile phone, a tablet computer, or a personal digital assistant. A person skilled in the art may understand that FIG. 2A is merely one instance of structural block diagrams related to the solution of this application, and does not constitute a limit to the terminal to which the solution of this application is applied. Specifically, the terminal may include more or less components than those shown in the figure, or combine some components, or have different component deployments.

Figure 2B:
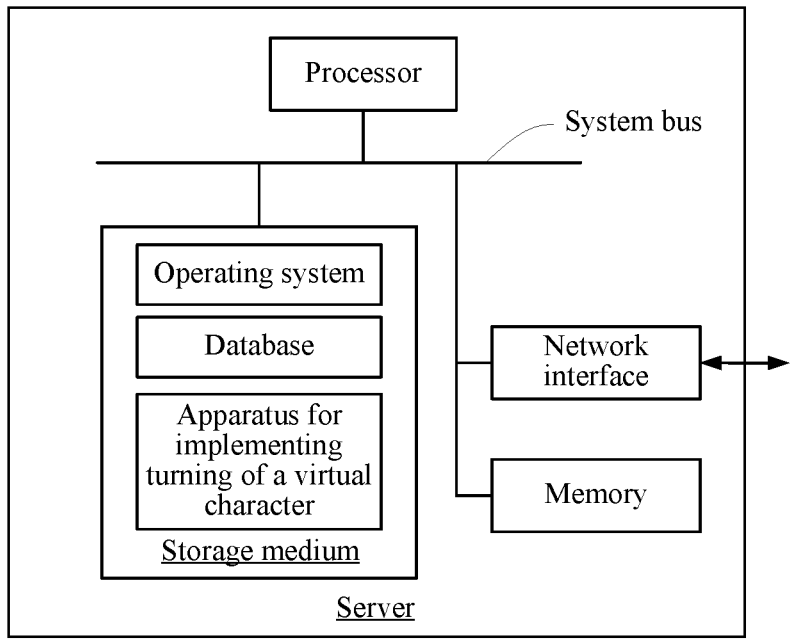
FIG. 2B is a schematic diagram of an internal structure of a server according to an embodiment.

FIG. 2B is a schematic diagram of an internal structure of a server according to an embodiment. As shown in FIG. 2B, the server includes a processor, a storage medium, a memory, and a network interface that are connected by using a system bus. The storage medium of the server stores an operating system, a database, and an apparatus for implementing turning of a virtual character, the database stores game scenario data and data related to a virtual character, and the apparatus for implementing turning of a virtual character is configured to implement a method for implementing turning of a virtual character. The processor of the server is configured to provide computing and control capabilities, to support operation of the entire server (e.g., implementing turning of a virtual character based on the instructions stored in the storage medium). The memory of the server provides an environment for operation of the apparatus for implementing turning of a virtual character in the storage medium. The network interface of the server is configured to perform connection and communication with an external terminal (e.g., the terminal shown in FIG. 2A) by using a network, for example, receive data of a virtual character that is uploaded by the terminal, and return other data of the virtual character to the terminal. The server may be implemented by an independent server or a server cluster formed by multiple servers. A person skilled in the art may understand that FIG. 2B is merely one of structural block diagrams related to the solution of this application, and does not constitute a limit to the server to which the solution of this application is applied. Specifically, the server may include more or less components than those shown in the figure, or combine some components, or have various component deployments.

Figure 3:
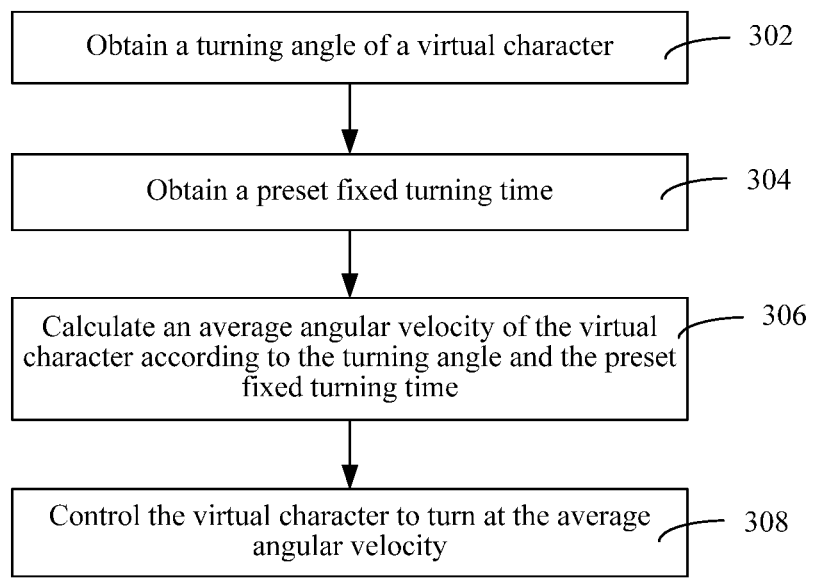
FIG. 3 is a flowchart of a method for implementing turning of a virtual character according to an embodiment.

FIG. 3 is a flowchart of a method for implementing turning of a virtual character according to an embodiment. As shown in FIG. 3, a method for implementing turning of a virtual character includes the following steps:

Step 302: Obtaining a turning angle of a virtual character.

Specifically, the virtual character refers to a virtual character in a game. Different characters may be selected according to different occupations. A game client is started and operated on a terminal. In a standalone game, no registration is needed, and only an entered character needs to be used as a username of a player for this time; in an online game, a server is logged in by using a registered account for a network connection, to perform an interactive operation with other users.

The terminal may be a desktop computer, a notebook computer, a tablet computer, a smartphone, a personal digital assistant, or the like.

The turning angle refers to an angle by which a virtual character is controlled to rotate, and for ease of calculation, the turning angle may be a value between 0 degrees and 360 degrees. The virtual character rotates when an input device such as a keyboard, a mouse, or a touchscreen enters an instruction. After a rotation angle exceeds 360 degrees, a remaining angle is obtained by subtracting 360 degrees multiplied by an integer multiple from the rotation angle, and the remaining angle is used as the turning angle.

The obtained turning angle may be, for example, 30 degrees, 40 degrees, or 280 degrees.

Step 304: Obtaining a preset fixed turning time.

Specifically, the preset fixed turning time refers to a fixed turning time set as required, and after the turning time is set, a turning time consumed is the fixed turning time regardless of a value of the turning angle. The fixed turning time may be 0.1 second, 0.2 second, or 1 second. The preset fixed turning time may be, for example, stored locally in a form of a configuration file.

Step 306: Calculating an average angular velocity of the virtual character according to the turning angle and the preset fixed turning time.

Specifically, the step of calculating an average angular velocity of the virtual character according to the turning angle and the preset fixed turning time includes: dividing the turning angle by the preset fixed turning time to obtain an average angular velocity of the virtual character. A calculation formula is the following formula (1):

$$v = \frac{\omega}{t}. \quad (1)$$

In the formula (1), ω is a turning angle, t is a preset fixed turning time, and υ is an average angular velocity.

For example, a turning angle is 280 degrees and a preset fixed turning time is 0.1 second, and in this case, an average angular velocity is 280 degrees/0.1 second and is equal to 2800 degrees/second.

Step 308: Controlling the virtual character to turn at the average angular velocity.

Specifically, in a game scenario, a virtual character is controlled to turn at a constant speed of the average angular velocity, and when the virtual character turns to an end position, turning is stopped.

According to the method for implementing turning of a virtual character, a turning angle of a virtual character is obtained, a preset fixed turning time is obtained, an average angular velocity is calculated, and the virtual character is controlled to turn at the average angular velocity. Turning is performed at a constant speed in a turning process, smooth turning can be implemented, stalling is avoided in the turning process, and picture fluency can be improved. When the turning angle is relatively large, the average angular velocity is high, and quick and smooth turning can be implemented; or when the turning angle is small, turning can also be implemented. Therefore, turning is more precise.

Figure 4:
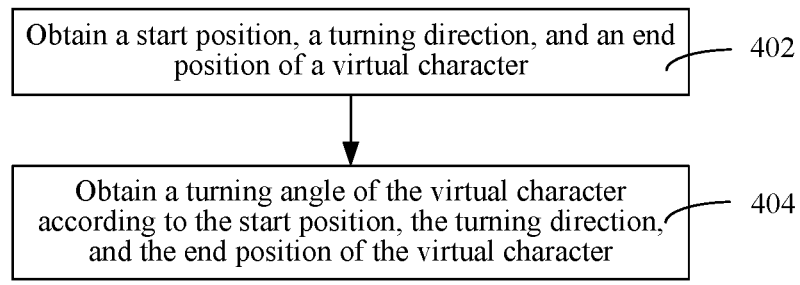
FIG. 4 is a flowchart of obtaining a turning angle of a virtual character according to an embodiment.

FIG. 4 is a flowchart of obtaining a turning angle of a virtual character according to an embodiment. As shown in FIG. 4, steps of obtaining a turning angle of a virtual character includes the following steps:

Step 402: Obtaining a start position, a turning direction, and an end position of a virtual character.

Specifically, a position of the virtual character is recorded in real time. At a time point when the virtual character is controlled to turn, a position at which the virtual character is located at this time is obtained as a turning start position. When a user generates an input instruction by using an input device, to control the virtual character to rotate to a position and stop rotation, a position at which rotation ends is recorded as the end position, and a rotation direction is recorded as the turning direction. The turning direction may be a clockwise direction or a counterclockwise direction.

Step 404: Obtaining a turning angle of the virtual character according to the start position, the turning direction, and the end position of the virtual character.

Specifically, the start position, the turning direction, and the end position of the virtual character are drawn to form the turning angle, and a value of the turning angle is calculated by using an angle calculator or a computation program.

It is convenient to calculate the turning angle of the virtual character by obtaining the start position, the turning direction, and the end position of the virtual character.

Figure 5:
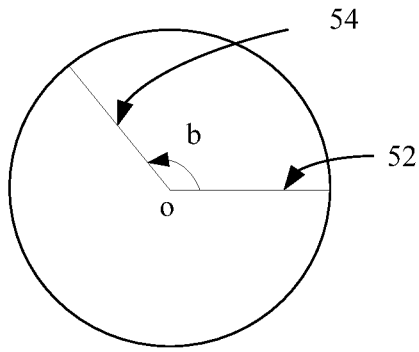
FIG. 5 is a schematic diagram of forming a turning angle.

FIG. 5 is a schematic diagram of forming a turning angle. As shown in FIG. 5, a start position of a virtual character is a line 52, the virtual character rotates counterclockwise, a turning direction is counterclockwise, an end position of the virtual character is a line 54, and the start position, the turning direction, and the end position form a turning angle b. A value of the turning angle b is calculated by using an angle calculator or a computation program.

In an embodiment, the obtaining a turning angle of a virtual character includes: obtaining a turning instruction generated by means of touch input, voice input, or gesture input; and obtaining a turning angle of a virtual character according to the turning instruction.

Specifically, generating a turning instruction by means of touch input refers to entering and generating a corresponding turning instruction by touching a touchscreen of mobile terminals such as a smartphone, for example, rotating clockwise or rotating counterclockwise on a touchscreen. A start position, a turning direction, and an end position of a virtual character may be obtained according to the input instruction generated by touching, and a turning angle of the virtual character may be calculated according to the start position, the turning direction, and the end position of the virtual character.

Generating a turning instruction by means of voice input refers to receiving voice information of a user, and recognizing the voice information to obtain a corresponding turning instruction. In voice input, a voice instruction recognition library needs to be created first, and the voice instruction recognition library records a correspondence between voice information and an instruction. After voice information of a user is recognized, a corresponding turning instruction is generated according to the voice information and the correspondence between voice information and an instruction. For example, content of voice information is rotating by 90 degrees clockwise.

Generating a turning instruction by means of gesture input refers to receiving an input gesture, and recognizing the gesture to obtain a corresponding turning instruction. In gesture input, a gesture instruction recognition library needs to be created first, and the gesture instruction recognition library records a correspondence between gesture information and an instruction. After a gesture of a user is recognized, a corresponding turning instruction is generated according to the gesture and the correspondence between a gesture and an instruction. For example, content of gesture information is rotating by 60 degrees clockwise.

In an embodiment, the method for implementing turning of a virtual character further includes: recording and storing each turning time and a corresponding end position of the virtual character.

Specifically, in a game scenario, a virtual character may be controlled to turn for multiple times, and a turning time and a corresponding end position are recorded for each time, to facilitate follow-up synchronization and update. The turning time refers to a time point at which turning is started. For example, a recorded turning time is at 1 o'clock 24 minutes 30 seconds, and an end position is represented by map coordinates (x, y) or a longitude and a latitude in the game scenario.

In an embodiment, the method for implementing turning of a virtual character further includes: comparing periodically each turning time and a corresponding end position of the virtual character that are recorded locally with each turning time and a corresponding end position of the virtual character that are recorded in a server, when a network is connected; and uploading each turning time and the corresponding end position of the virtual character that are recorded locally to the server, to update each turning time and the corresponding end position of the virtual character that are recorded in the server, if each turning time and the corresponding end position of the virtual character that are recorded locally are not the same as each turning time and the corresponding end position of the virtual character that are recorded in the server; or skipping update, if each turning time and the corresponding end position of the virtual character that are recorded locally are the same as each turning time and the corresponding end position of the virtual character that are recorded in the server.

Specifically, the terminal is connected to the server, a game client on the terminal is connected to a game server, and a user logs in to the game server by using an account. Each turning time and a corresponding end position of the virtual character is recorded locally (that is, on the terminal). Each turning time and the corresponding end position of the virtual character that are recorded locally may be compared periodically with each turning time and the corresponding end position of the virtual character that are recorded in the server, to compare whether data of the two is the same. If the data of the two is not the same, each turning time and the corresponding end position of the virtual character that are recorded locally may be uploaded to the server, to update each turning time and the corresponding end position of the virtual character that are recorded in the server, and an end position of the virtual character after final turning may be displayed.

In addition, a start position and an average angular velocity of the virtual character may further be recorded.

The end position of the virtual character after the final turning is displayed on the terminal, and the user cannot sense a periodic comparison process on the terminal. When the server sends end position information of the virtual character on a terminal to another terminal for displaying, a buffering manner is used to ensure consistency of data and avoid stalling.

It should be noted that data for calculating the turning angle does not need to be uploaded to the server, and calculation processing is performed locally, to save a network resource and reduce a burden on the server. Certainly, alternatively, the server may calculate the turning angle and the average angular velocity.

To describe more clearly the method for implementing turning of a virtual character, descriptions of processing processes in which the method is applied to a standalone game and an online game are provided below.

Figure 6:
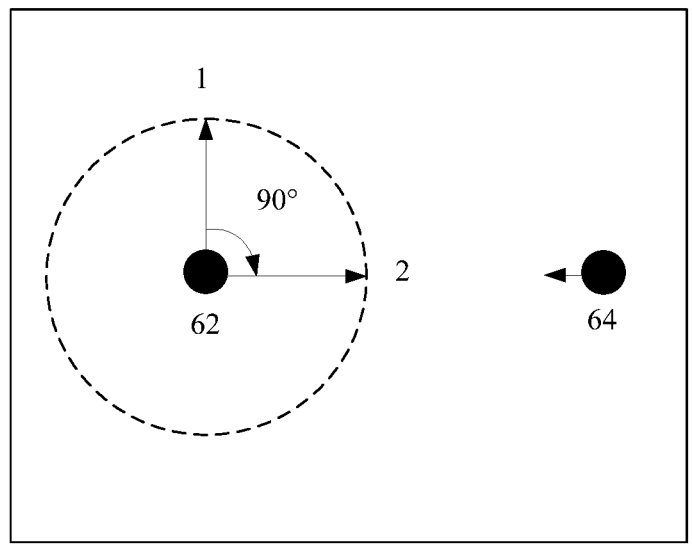
FIG. 6 is a schematic diagram of implementing turning of a virtual character in a standalone game.

FIG. 6 is a schematic diagram of implementing turning of a virtual character in a standalone game. In a standalone game, a user enters a game scenario by entering a player name or a player number, and in the game scenario, the user may control a corresponding virtual character 62 by using input devices such as a keyboard, a mouse, or a touchscreen. A process of implementing turning of the virtual character 62 includes: obtaining a start position, a turning direction, and an end position of the virtual character according to a turning instruction, after the turning instruction entered by the user is detected, forming a turning angle according to the start position, the turning direction, and the end position of the virtual character, calculating a value of the turning angle, obtaining a preset fixed turning time from a configuration file, dividing the turning angle by the fixed turning time to obtain an average angular velocity, and performing turning at a constant speed of the average angular velocity. Therefore, smooth turning and picture fluency are implemented. In FIG. 6, the virtual character 62 is controlled to turn by 90° from a position 1 to a position 2, that is, directly facing a little monster 64. The little monster is a virtual creature in the game scenario.

Figure 7:
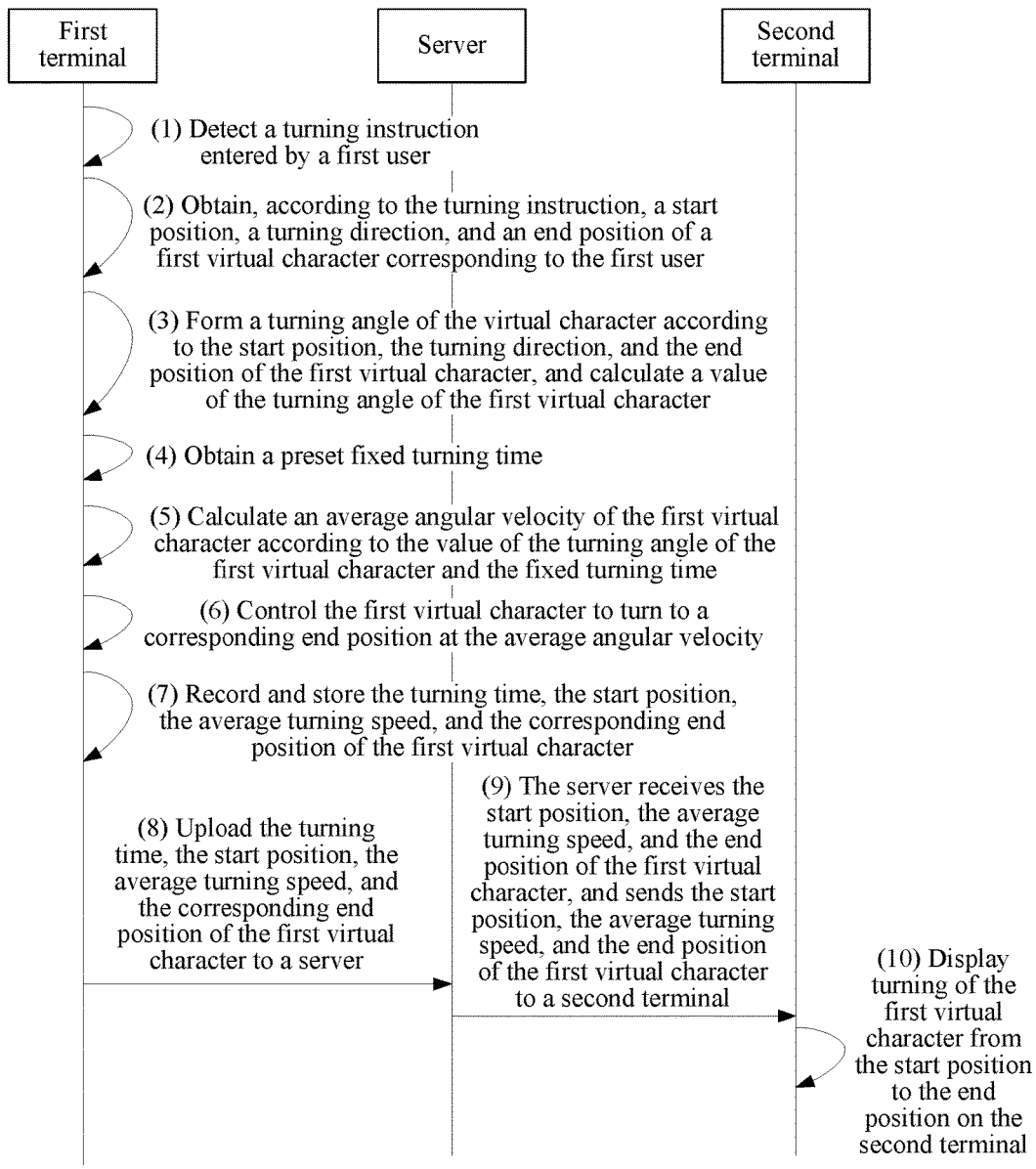
FIG. 7 is a sequence diagram of processing for implementing turning of a virtual character in an online game.

FIG. 7 is a sequence diagram of processing for implementing turning of a virtual character in an online game. In an online game, each user logs in to a game server by using a registered account, and enters a game scenario by using a virtual character name corresponding to the registered account, and the user may control a corresponding virtual character by using input devices such as a keyboard, a mouse, or a touchscreen. As shown in FIG. 7, a process of implementing turning of a virtual character includes the following steps: (1) detecting, by a first terminal, a turning instruction entered by a first user; (2) obtaining, by the first terminal according to the turning instruction, a start position, a turning direction, and an end position of a first virtual character corresponding to the first user; (3) forming, by the first terminal, a turning angle of the virtual character according to the start position, the turning direction, and the end position of the first virtual character, and calculating a value of the turning angle of the first virtual character; (4) obtaining, by the first terminal, a preset fixed turning time; (5) calculating, by the first terminal, an average angular velocity of the first virtual character according to the value of the turning angle of the first virtual character and the fixed turning time; (6) controlling, by the first terminal, the first virtual character to turn to a corresponding end position at the average angular velocity; (7) recording and storing, by the first terminal, the turning time, the start position, the average turning speed, and the corresponding end position of the first virtual character; (8) uploading, by the first terminal, the turning time, the start position, the average turning speed, and the corresponding end position of the first virtual character to a server; (9) receiving, by the server, the start position, the average turning speed, and the end position of the first virtual character, and sending the start position, the average turning speed, and the end position of the first virtual character to a second terminal; and (10) displaying turning of the first virtual character from the start position to the end position on the second terminal.

For example, the back of a first virtual character is toward a second virtual character, and after the first virtual character turns by 180 degrees, the first virtual character faces towards the second virtual character.

Figure 8:
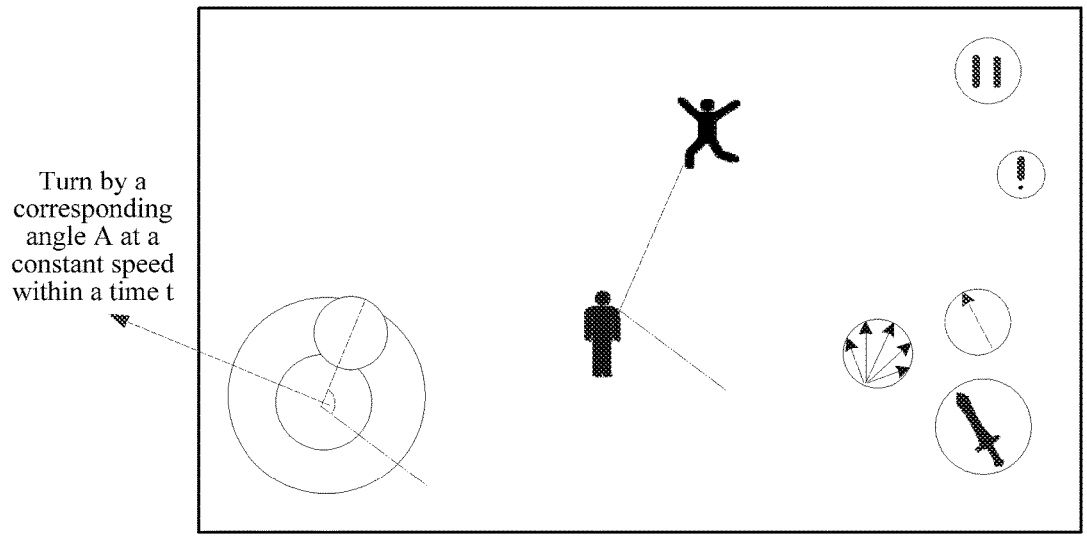
FIG. 8 is a schematic effect diagram showing that an NPC is controlled to turn at a constant speed.

The method for implementing turning of a virtual character may be applied to a multiplayer online battle arena games (MOBA) scenario and a mobile game product. The mobile game may include a standalone game and an online game. In an MOBA scenario or a mobile game, a player controls an NPC (a character in the game, that is, a virtual character) to turn. Because a turning time is preset, and a turning angle is obtained, an average angular velocity may be obtained by dividing the turning angle by the turning time, and the NPC is controlled to turn at the average angular velocity, to avoid stalling that occurs in a turning process and improve fluency of a turning picture. As shown in FIG. 8, in a mobile game, an NPC is controlled to turn by a corresponding angle A at a constant speed within a time t.

In addition, the method for implementing turning of a virtual character may also be applied to a game scenario in which an operation is performed by using a mouse on a personal computer, a corresponding turning angle is obtained by obtaining a start position of a virtual character controlled by a mouse, and an end position after turning, a corresponding average angular velocity is obtained by obtaining a ratio of the turning angle to the time, and the virtual character is controlled to turn at a constant speed of the average angular velocity, so that stalling that occurs in a turning process may be avoided, and fluency of a turning picture may be improved.

Figure 9:
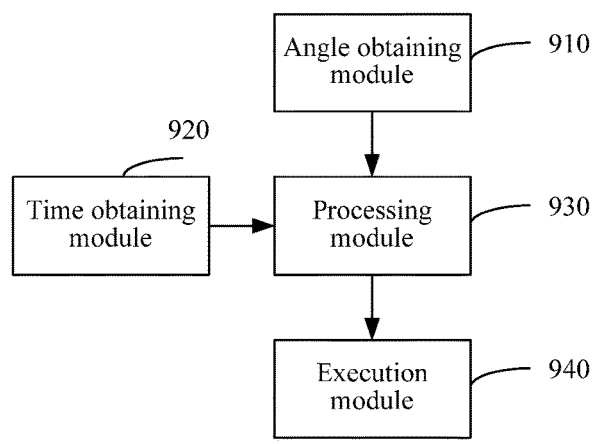
FIG. 9 is a structural block diagram of an apparatus for implementing turning of a virtual character according to an embodiment.

FIG. 9 is a structural block diagram of an apparatus for implementing turning of a virtual character according to an embodiment. As shown in FIG. 9, the apparatus for implementing turning of a virtual character is operated on a terminal, and includes multiple program modules. The multiple program modules may be stored in a memory and executable by a processor. The multiple program modules may include an angle obtaining module 910, a time obtaining module 920, a processing module 930, and an execution module 940.

The angle obtaining module 910 is configured to obtain a turning angle of a virtual character.

Specifically, the virtual character refers to a virtual character in a game. Different characters may be selected according to different occupations. A game client is started and operated on a terminal. In a standalone game, no registration is needed, and only an entered character needs to be used as a username of a player for this time; in an online game, a server is logged in by using a registered account for a network connection, to perform an interactive operation with other users.

The terminal may be a desktop computer, a notebook computer, a tablet computer, a smartphone, a personal digital assistant, or the like.

The turning angle refers to an angle by which a virtual character is controlled to rotate, and for ease of calculation, the turning angle may be a value between 0 degrees and 360 degrees. The virtual character rotates when an input device such as a keyboard, a mouse, or a touchscreen enters an instruction. After a rotation angle exceeds 360 degrees, a remaining angle is obtained by subtracting 360 degrees multiplied by an integer multiple from the rotation angle, and the remaining angle is used as the turning angle.

The obtained turning angle may be, for example, 30 degrees, 40 degrees, or 280 degrees.

In an embodiment, the angle obtaining module 910 is further configured to: obtain a start position, a turning direction, and an end position of a virtual character; and obtain a turning angle of the virtual character according to the start position, the turning direction, and the end position of the virtual character.

Specifically, a position of the virtual character is recorded in real time. At a time point when the virtual character is controlled to turn, a position at which the virtual character is located at this time is obtained as a turning start position. When a user generates an input instruction by using an input device, to control the virtual character to rotate to a position and stop rotation, a position at which rotation ends is recorded as the end position, and a rotation direction is recorded as the turning direction. The turning direction may be a clockwise direction or a counterclockwise direction. The start position, the turning direction, and the end position the virtual character are drawn to form the turning angle, and a value of the turning angle is calculated by using an angle calculator or a computation program. It is convenient to calculate the turning angle of the virtual character by obtaining the start position, the turning direction, and the end position of the virtual character.

In an embodiment, the angle obtaining module 910 is further configured to: obtain a turning instruction generated by means of touch input, voice input, or gesture input; and obtain a turning angle of a virtual character according to the turning instruction.

Specifically, generating a turning instruction by means of touch input refers to entering and generating a corresponding turning instruction by touching a touchscreen, for example, rotating clockwise or rotating counterclockwise on a touchscreen. A start position, a turning direction, and an end position of a virtual character may be obtained according to the input instruction generated by touching, and a turning angle of the virtual character may be calculated according to the start position, the turning direction, and the end position of the virtual character.

Generating a turning instruction by means of voice input refers to receiving voice information of a user, and recognizing the voice information to obtain a corresponding turning instruction. In voice input, a voice instruction recognition library needs to be created first, and the voice instruction recognition library records a correspondence between voice information and an instruction. After voice information of a user is recognized, a corresponding turning instruction is generated according to the voice information and the correspondence between voice information and an instruction. For example, content of voice information is rotating by 90 degrees clockwise.

Generating a turning instruction by means of gesture input refers to receiving an input gesture, and recognizing the gesture to obtain a corresponding turning instruction. In gesture input, a gesture instruction recognition library needs to be created first, and the gesture instruction recognition library records a correspondence between gesture information and an instruction. After a gesture of a user is recognized, a corresponding turning instruction is generated according to the correspondence between gesture information and an instruction. For example, content of gesture information is rotating by 60 degrees clockwise.

The time obtaining module 920 is configured to obtain a preset fixed turning time.

Specifically, the preset fixed turning time refers to a fixed turning time set as required, and after the turning time is set, a turning time consumed is the fixed turning time regardless of a value of the turning angle. The fixed turning time may be 0.1 second, 0.2 second, or 1 second. The preset fixed turning time may be, for example, stored locally in a form of a configuration file.

The processing module 930 is configured to calculate an average angular velocity of the virtual character according to the turning angle and the preset fixed turning time.

Specifically, the step of calculating an average angular velocity of the virtual character according to the turning angle and the preset fixed turning time includes: dividing the turning angle by the preset fixed turning time to obtain an average angular velocity of the virtual character. A calculation formula is the following formula (1):

$$\upsilon = \frac{\omega}{t}. \qquad (1)$$

In the formula (1), $\omega$ is a turning angle, t is a preset fixed turning time, and $\upsilon$ is an average angular velocity.

For example, a turning angle is 280 degrees and a preset fixed turning time is 0.1 second, and in this case, an average angular velocity is 280 degrees/0.1 second and is equal to 2800 degrees/second.

The execution module 940 is configured to control the virtual character to turn at the average angular velocity.

Specifically, in a game scenario, a virtual character is controlled to turn at a constant speed of the average angular velocity, and when the virtual character turns to an end position, turning is stopped.

According to the apparatus for implementing turning of a virtual character, a turning angle of a virtual character is obtained, a preset fixed turning time is obtained, an average angular velocity is calculated, and the virtual character is controlled to turn at the average angular velocity. Turning is performed at a constant speed in a turning process, smooth turning can be implemented, stalling is avoided in the turning process, and picture fluency can be improved. When the turning angle is relatively large, the average angular velocity is high, and quick and smooth turning can be implemented; or when the turning angle is small, turning can also be implemented. Therefore, turning is more precise.

Figure 10:
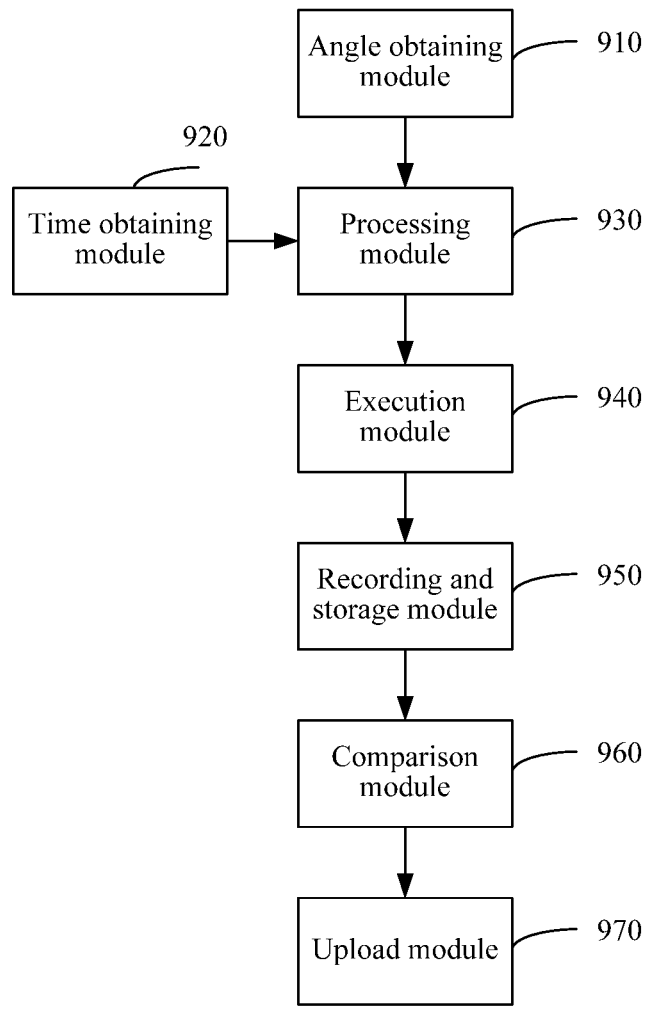
FIG. 10 is a structural block diagram of an apparatus for implementing turning of a virtual character according to another embodiment.

FIG. 10 is a structural block diagram of an apparatus for implementing turning of a virtual character according to another embodiment. As shown in FIG. 10, the apparatus for implementing turning of a virtual character is operated on a terminal, and in addition to the angle obtaining module 910, the time obtaining module 920, the processing module 930, and the execution module 940, the apparatus further includes a recording and storage module 950, a comparison module 960, and an upload module 970.

The recording and storage module 950 is configured to record and store each turning time and a corresponding end position of a virtual character.

Specifically, in a game scenario, a virtual character may be controlled to turn for multiple times, and a turning time and a corresponding end position are recorded for each time, to facilitate follow-up synchronization and update. The turning time refers to a time point at which turning is started. For example, a recorded turning time is at 1 o'clock 24 minutes 30 seconds, and an end position is represented by map coordinates (x, y) or a longitude and a latitude in the game scenario. In addition, a start position and an average angular velocity of the virtual character may further be recorded.

The comparison module 960 is configured to compare periodically each turning time and a corresponding end position of the virtual character that are recorded locally with each turning time and a corresponding end position of the virtual character that are recorded in a server, when a network is connected.

The upload module 970 is configured to upload each turning time and the corresponding end position of the virtual character that are recorded locally to the server, to update each turning time and the corresponding end position of the virtual character that are recorded in the server, when each turning time and the corresponding end position of the virtual character that are recorded locally are not the same as each turning time and the corresponding end position of the virtual character that are recorded in the server.

Specifically, each turning time and the corresponding end position of the virtual character that are recorded locally may be compared periodically with each turning time and the corresponding end position of the virtual character that are recorded in the server, to compare whether data of the two is the same. If the data of the two is not the same, each turning time and the corresponding end position of the virtual character that are recorded locally may be uploaded to the server, to update each turning time and the corresponding end position of the virtual character that are recorded in the server, and an end position of the virtual character after final turning may be displayed.

A person of ordinary skill in the art may understand that all or some of the processes of the methods in the foregoing embodiments may be implemented by a computer program instructing relevant hardware. The program may be stored in a non-volatile computer readable storage medium. When the program is executed, processes of the foregoing method embodiments may be performed. The storage medium may be a magnetic disk, an optical disc, a read-only memory (ROM), or the like.

The foregoing embodiments only describe several implementation manners of the present disclosure, and their description is specific and detailed, but cannot therefore be understood as a limitation to the patent scope of the present disclosure. It should be noted that, a person of ordinary skill in the art may further make some variations and improvements without departing from the concept of the present disclosure, and the variations and improvements belong to the protection scope of the present disclosure. Therefore, the protection scope of the present disclosure should be subject to the protection scope of the appended claims.

What is claimed is:

1. A method for implementing turning of a virtual character operated on a terminal including a processor, a storage medium and a display unit that are coupled to the processor, comprising:
   obtaining, by the processor, data of the virtual character including start positional data, end positional data, and turning data, the turning data indicating a turning direction;
   obtaining, by the processor, a turning angle of the virtual character according to the start positional data, the end positional data, and the turning data;
   obtaining, by the processor, a preset fixed turning time stored in the storage medium;
   calculating, by the processor, an average angular velocity of the virtual character according to the turning angle and the preset fixed turning time;
   controlling, on the display unit of the terminal, the virtual character to turn at the average angular velocity;
   recording and storing, by the processor, each turning time and a corresponding end position of the virtual character in the storage medium;
   comparing periodically, by the processor, each turning time and a corresponding end position of the virtual character that are recorded locally with each turning time and a corresponding end position of the virtual character that are recorded in a server, when a network is connected; and
   uploading, by the processor, each turning time and the corresponding end position of the virtual character that are recorded locally to the server, to update each turning time and the corresponding end position of the virtual character that are recorded in the server, if each turning time and the corresponding end position of the virtual character that are recorded locally are not the same as each turning time and the corresponding end position of the virtual character that are recorded in the server.

2. The method according to claim 1, wherein the obtaining the turning angle of the virtual character comprises:
   obtaining, by the processor, a turning instruction generated by means of a touch input, a voice input, or a gesture input; and
   obtaining, by the processor, the turning angle of the virtual character according to the turning instruction.

3. The method according to claim 2, wherein the obtaining the turning instruction generated by means of the gesture input, including:
   establishing, by the processor, a gesture instruction recognition library in the storage medium;
   receiving, by the processor, the gesture input; and
   matching and recognizing, by the processor, the gesture input according to data in the gesture instruction recognition library to obtain the turning instruction.

4. The method according to claim 1, wherein the method further comprises:
   recording and storing, by the processor, a start position and the average angular velocity of the virtual character in the storage medium, the start position corresponding to the start positional data.

5. The method according to claim 1, wherein the calculating the average angular velocity of the virtual character according to the turning angle and the preset fixed turning time comprises: dividing the turning angle by the preset fixed turning time to obtain the average angular velocity of the virtual character.

6. The method according to claim 1, wherein the controlling the virtual character to turn at the average angular velocity comprises: controlling the virtual character to turn at a constant speed of the average angular velocity, and stopping turning when the virtual character turns to an end position corresponding to the end positional data.

7. A terminal, comprising:
a display unit;
a storage medium; and
a processor coupled to the storage medium and the display unit and configured to:
obtain data of the virtual character including start positional data, end positional data, and turning data, the turning data indicating a turning direction;
obtain a turning angle of the virtual character according to the start positional data, the end positional data, and the turning data;
obtain a preset fixed turning time stored in the storage medium;
calculate an average angular velocity of the virtual character according to the turning angle and the preset fixed turning time;
control the virtual character to turn at the average angular velocity on the display unit;
record and store each turning time and a corresponding end position of the virtual character in the storage medium;
compare periodically each turning time and a corresponding end position of the virtual character that are recorded locally with each turning time and a corresponding end position of the virtual character that are recorded in a server, when a network is connected; and
upload each turning time and the corresponding end position of the virtual character that are recorded locally to the server, to update each turning time and the corresponding end position of the virtual character that are recorded in the server, if each turning time and the corresponding end position of the virtual character that are recorded locally are not the same as each turning time and the corresponding end position of the virtual character that are recorded in the server.

8. The terminal according to claim 7, wherein the processor is further configured to:
obtain a turning instruction generated by means of a touch input, a voice input, or a gesture input; and
obtain the turning angle of the virtual character according to the turning instruction.

9. A non-transitory computer-readable medium storing a computer-executable program that, when being executed by a processor, causes the processor to:

obtain data of the virtual character including start positional data, end positional data, and turning data, the turning data indicating a turning direction;
obtain a turning angle of the virtual character according to the start positional data, the end positional data, and the turning data;
obtain a preset fixed turning time;
calculate an average angular velocity of the virtual character according to the turning angle and the preset fixed turning time;
control the virtual character to turn at the average angular velocity on a display unit coupled to the processor;
record and store each turning time and a corresponding end position of the virtual character in the storage medium;
compare periodically each turning time and a corresponding end position of the virtual character that are recorded locally with each turning time and a corresponding end position of the virtual character that are recorded in a server, when a network is connected; and
upload each turning time and the corresponding end position of the virtual character that are recorded locally to the server, to update each turning time and the corresponding end position of the virtual character that are recorded in the server, if each turning time and the corresponding end position of the virtual character that are recorded locally are not the same as each turning time and the corresponding end position of the virtual character that are recorded in the server.

10. The non-transitory computer-readable medium according to claim 9, wherein the obtaining the turning angle of the virtual character comprises:
obtaining a turning instruction generated by means of a touch input, a voice input, or a gesture input; and
obtaining the turning angle of the virtual character according to the turning instruction.

11. The method according to claim 1, wherein the turning angle is a value between 0 degree and 360 degrees, and if a rotation angle exceeds 360 degrees, the turning angle is calculated by subtracting an integer multiple of 360 degrees from the rotation angle.

12. The method according to claim 1, further comprising:
at a time point when the virtual character is controlled to turn, obtaining data of a position at which the virtual character is located at the time point as the start positional data.

* * * * *